(No Model.)   2 Sheets—Sheet 1.

R. W. ELSTON.
SELF PROPELLING VEHICLE.

No. 576,517.   Patented Feb. 2, 1897.

WITNESSES:
Geo. E. Fuchs
James W. Birant

INVENTOR
R. W. Elston
BY
Pattison Nesbit
ATTORNEYS.

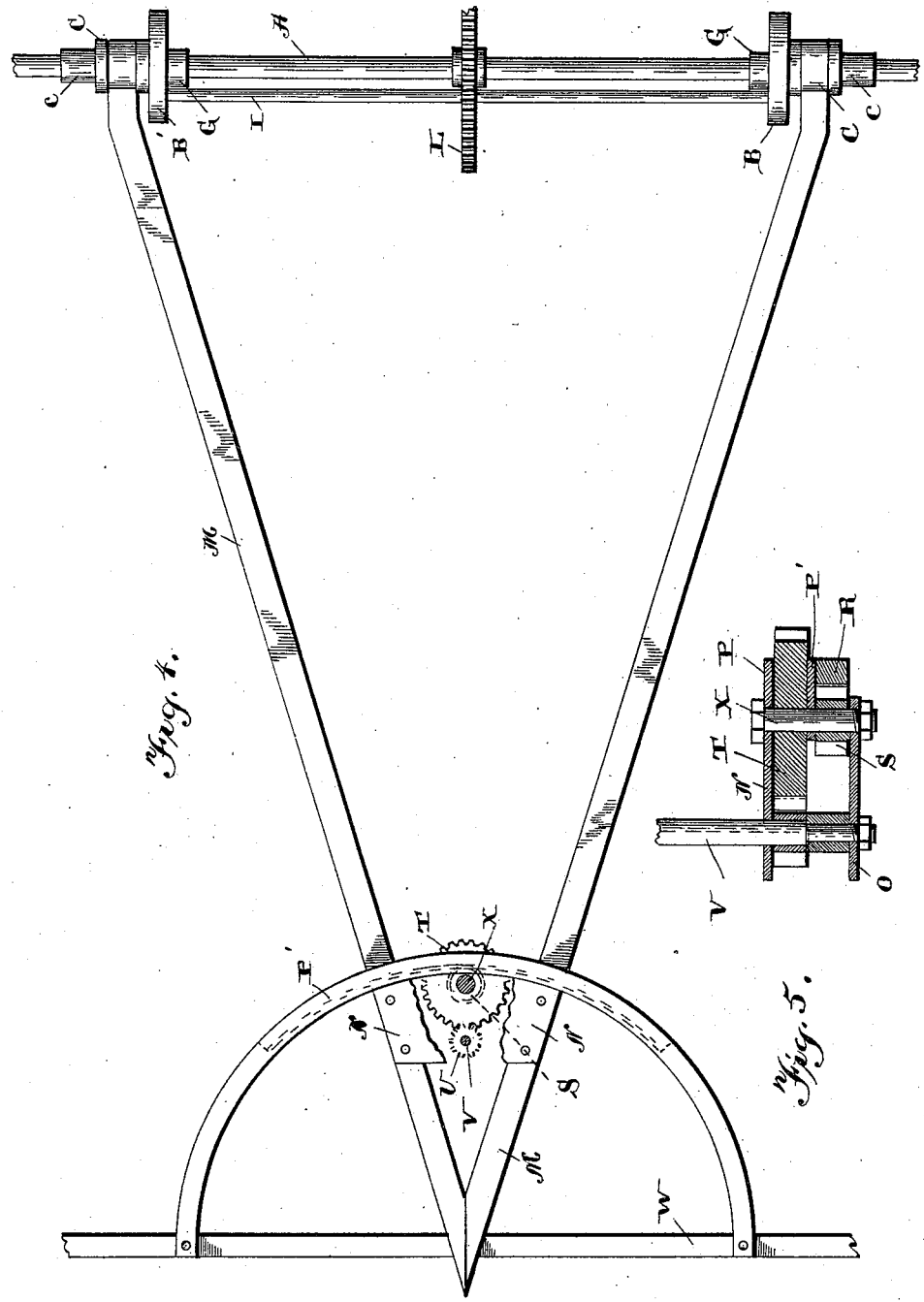

UNITED STATES PATENT OFFICE.

ROBERT W. ELSTON, OF CHARLEVOIX, MICHIGAN.

SELF-PROPELLING VEHICLE.

SPECIFICATION forming part of Letters Patent No. 576,517, dated February 2, 1897.

Application filed May 25, 1895. Serial No. 550,671. (No model.)

*To all whom it may concern:*

Be it known that I, ROBERT W. ELSTON, of Charlevoix, in the county of Charlevoix and State of Michigan, have invented certain new and useful Improvements in Self-Propelled Vehicles; and I do hereby declare the following to be a full, clear, and exact description of the invention, such as will enable others skilled in the art to which it pertains to make and use it, reference being had to the accompanying drawings, which form part of this specification.

My invention relates to improvements in self-propelling vehicles, and pertains especially to the driving means and to the steering mechanism, all of which will be fully described hereinafter and particularly pointed out in the claim.

The primary object of my invention is to so construct the mechanism for driving the drive-wheels that they are locked to the shaft when driven in a straight course and revolve at the same speed, but when the direction or course is changed to a curve, and a force thereby brought to bear upon one of the wheels, tending to force it in the opposite direction, the mechanism will cause one wheel to rotate slower than the other independent of the shaft, thus avoiding the friction and slip which is caused where the wheels are made rigid to the shaft and cannot have any independent rotation.

Another object of my invention is to provide a simple and efficient steering mechanism for the front wheels of the vehicle.

Figure 1:
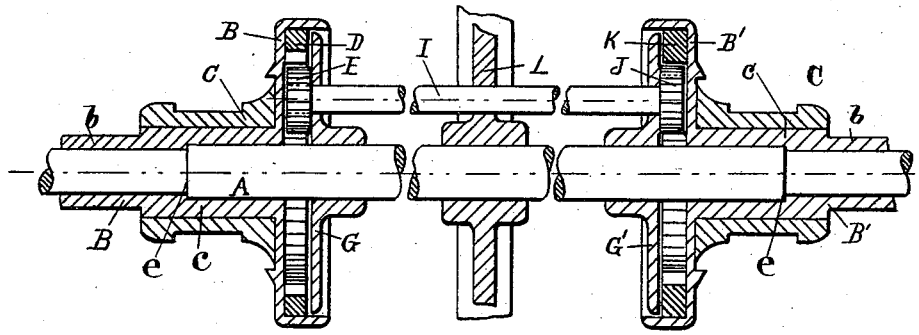
Figure 2:
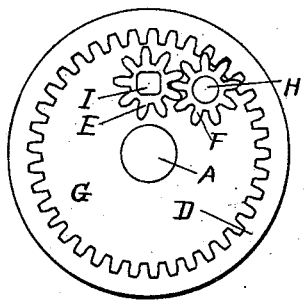
Figure 3:
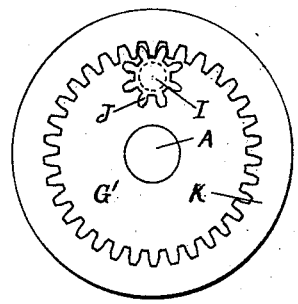

In the accompanying drawings, Figure 1 is a longitudinal sectional view through the driving-axle and its mechanism. Fig. 2 is an end view of the left-hand end of Fig. 1. Fig. 3 is an end view of the opposite end of Fig. 1, the casing G and G' being omitted in both figures. Fig. 4 is a plan view of the running-gear of a vehicle having my automatic attachment and steering mechanism applied thereto. Fig. 5 is an enlarged vertical longitudinal section through the center of the steering mechanism, taken on the dotted lines *y y* of Fig. 4.

Where the drive-wheels of self-propelling vehicles, such as street-cars and other self-propelling vehicles, have been rigidly attached to opposite ends of the axle and have no independent rotation it is well-known that there is a friction and a slip of one or both of the wheels in turning a curve, which is a great loss of power, and it is the primary object of the present invention to overcome this objection.

A indicates the driving-axle of any self-propelling vehicle, which is surrounded at each end by the sleeve *c*, independently-rotatable thereupon, the inner ends of these sleeves having integral laterally-extending annular flanges B and B', which are substantially L-shaped in cross-section and form part of the housing or casing for the mechanism to be now described. The outer ends of these sleeves *c* have the reduced portions *b*, upon which the drive-wheels are rigidly attached and held by any suitable means and locked thereto to prevent any independent rotation of the parts. The ends of the axle A have the shoulders *e*, and the inner portions of the sleeves are correspondingly formed to hold the sleeves in their proper positions upon the axle and to prevent their inward movement thereon.

Secured to the inner side of the castings or housings B and B' are the internal gears D and K, respectively, the internal gearing D being larger than the internal gearing K, so that the pinion E, carried upon one end of the shaft I, will not engage the internal gear D, while the pinion J, secured to the opposite end of the shaft I, meshes with the internal gearing K. This shaft I has its bearings in the inner portions G and G' of the castings or housings, which are rigidly connected to and revolve with shaft A. The shaft I also has an intermediate bearing in the drive-gear L, which is likewise firmly keyed or locked in any suitable manner to the said drive-shaft A. It will thus be seen that the shaft I is firmly supported and journaled to have a rotation independent of the shaft A, while at the same time it is carried around in a circle, of which the center of the shaft is its center, through the medium of the supports before mentioned. The pinion E at one end of the shaft I being out of engagement with the internal gear, as before mentioned, an idler-pinion F is suitably journaled to the portion G, which is firmly connected with the drive-shaft A.

The operation of this construction is that when a rotary motion is imparted to the shaft A through the medium of the drive-wheel L said motion is likewise conveyed to the portions B and B' of the housings, thus carrying around with them shaft I, and this shaft I being in mesh with the gears D and K, which are firmly connected with the drive-wheels, as before described, the drive-wheels are likewise rotated. So long as the shaft A is in a straight line for propelling the vehicle straight forward both drive-wheels are rotated equally and locked to the shaft through the medium of the mechanism just described and will be readily understood, but when the course of the vehicle is changed out of a direct line, thus tending to cause one drive-wheel to rotate slower than the other, the tendency of the slow wheel is transferred through the medium of the shaft I and gearing mentioned to the wheel at the opposite side of the shaft, thus causing it to rotate faster, and vice versa. The speed of the wheels is proportioned exactly according to the curve being made, thus preventing entirely all friction which is caused where the wheels are locked to the drive-shaft and cannot have any independent rotation, as will be readily understood.

Referring to the steering mechanism illustrated in Figs. 4 and 5, M represents a reach, N a plate secured to the top of the reach near their front ends, and O a plate similarly situated and secured to the under side of the reach. A vertical shaft V is journaled in these plates N and O, carrying a pinion U, which in turn meshes with a cog-wheel carried by a bolt X, likewise supported in the plates N and O. This bolt X carries beneath the wheel T a pinion S, which meshes with a cog-gear R, secured to the segment P', which is beneath the reach. Above the reach is a segment P, corresponding with the segment P', which are united at their front ends to the upper and lower sides of the front axle W, as clearly illustrated. An operating-wheel will be secured to the upper end of shaft V in a convenient position for the driver or operator, so that by turning the shaft the front wheels of the vehicle are turned in opposite directions to guide the vehicle, as will be readily understood.

Secured to the sleeves c are the journals C, which are supported in the ordinary boxes or bearings of the vehicle and support and hold the sleeves in their proper relative position, as will be readily understood.

I am aware that it is not new in self-propelled vehicles to employ a short auxiliary shaft arranged at an angle to the main drive-shaft and entirely housed within the drive-wheels.

I am also aware that it is old in machines of the character described to employ a drive-shaft constructed in two pieces which are held together by a sleeve or ferrule, and such construction I do not claim.

Having thus fully described my invention, what I claim, and desire to secure by Letters Patent, is—

In a drive mechanism for self-propelling vehicles, the combination of the drive-shaft axle constructed of a single piece, sleeves mounted thereon and independently rotatable thereof, the said sleeves each provided with integrally-formed lateral annular housings provided with internal gears, one internal gear being larger than the other, for the purposes specified, supports rigidly connected with the drive-shaft, a drive gear-wheel connected directly with the drive-shaft and arranged midway the ends thereof, a counter-shaft extending in a plane parallel with the drive-shaft and supported by the said supports and passing through the drive-wheel, the said counter-shaft provided with a removable pinion-wheel at each end, one of the pinion-wheels meshing directly with the smaller of the internal gears of the annular housings, and the other pinion-wheel adapted to mesh with the larger of the internal gears by means of an idler-wheel attached to the inner face of the annular housing carrying the larger internal gear, and the idler-wheel, substantially as described and for the purpose set forth.

In testimony whereof I affix my signature in presence of two witnesses.

ROBERT W. ELSTON.

Witnesses:
FREDERICK W. MAYNE,
ROBERT MILLER.